May 3, 1966  S. L. SCHWARTZ  3,248,852
DOG AND ANIMAL GARMENT
Filed Sept. 10, 1964
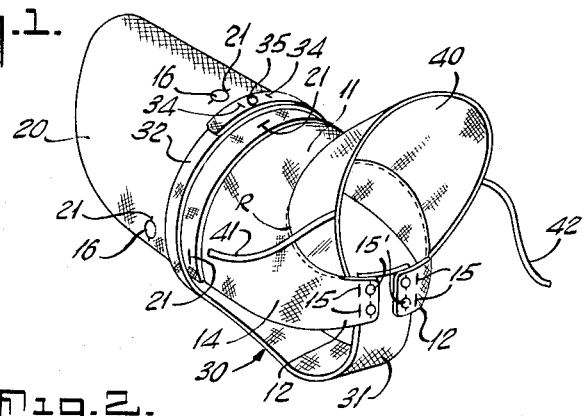
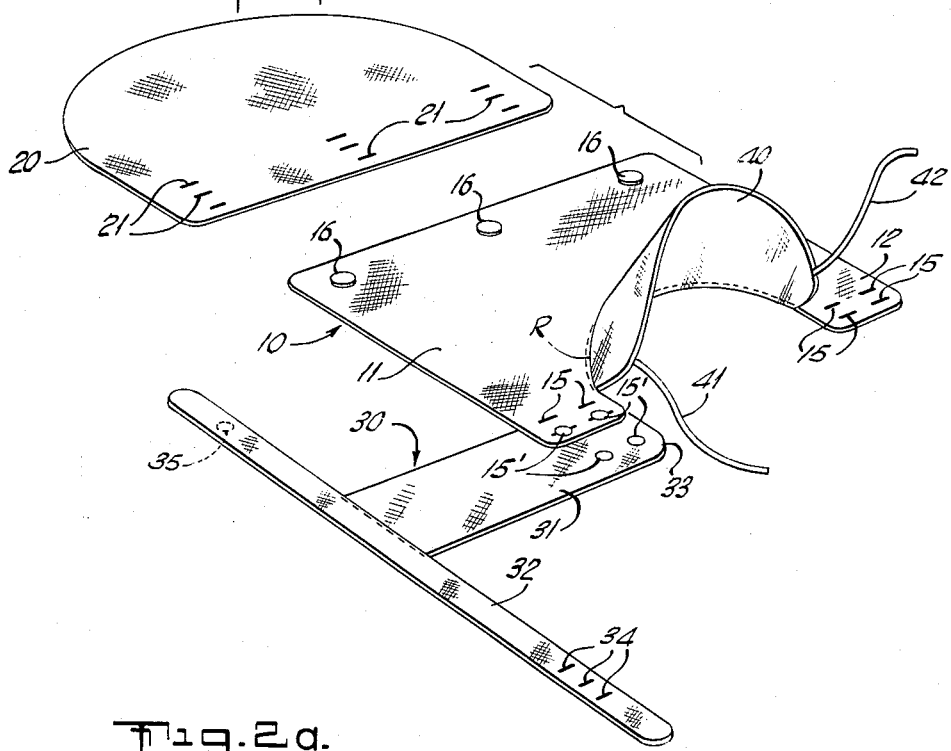
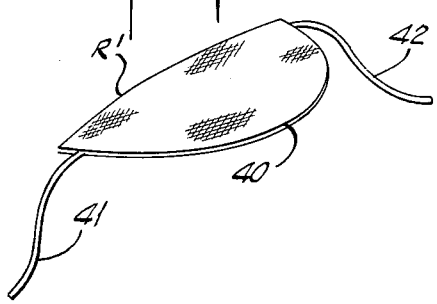
INVENTOR
SOL L. SCHWARTZ
BY
Hopgood & Calimafde
ATTORNEYS

United States Patent Office 3,248,852
Patented May 3, 1966

3,248,852
DOG AND ANIMAL GARMENT
Sol L. Schwartz, 67—40 173rd St., Flushing, N.Y.
Filed Sept. 10, 1964, Ser. No. 395,422
6 Claims. (Cl. 54—79)

This invention relates generally to garments for four-legged domestic animals, such as dogs, and in particular to a garment which is adaptable, without regard to the animal's size (within limits) for its familiar function of keeping the animal warm.

While the invention, as will be apparent, is suitable for various domestic animals, it is principally directed to the dog and for this reason and for simplicity of discussion, the dog will be exclusively referred to hereinafter.

With the increased number of short haired breeds available in this country and elsewhere, where the ambient temperature is often below that which the particular breed requires to maintain its normal body temperature, it becomes desirable, if not necessary, to insulate the animal out of doors during the winter months. While a variety of animal garments are available for this function they suffer from one or more of the following disadvantages.

Non-flexible garments require the retailer to stock a large variety of sizes in order to cope with current breeds, which range from a few pounds to over a hundred. The owner, too, must be prepared to buy larger garments as the dog grows to maturity. While sweater type garments provide a degree of size flexibility, they are restricted by their inherent elasticity. Further, the more these type garment are stretched, the more the insulating property of the material is decreased and the more it tends to "hike up" and leave the lower back portion exposed. Further considerations are the ability of the garment to stay in place while the animal is being exercised, and the sometimes diametrically opposed consideration that the garment must not interfere with natural body functions; the latter of which becomes increasingly difficult with male dogs.

Accordingly, it is the object of this invention to provide an animal garment which is flexible as to size, and hence does not require a large inventory to be stocked by the retailer; which may grow with the animal as it matures; which stays in place without interfering with normal body functions; and which provides an optimum coverage of the animal's exposed portions.

The above mentioned and other features and objects of this invention and the manner of attaining them will become more apparent and the invention itself will best be understood by reference to the following description of an embodiment of the invention taken in conjunction with the accompanying drawings wherein:

FIG. 1 illustrates the garment according to the invention as it would appear in use;

FIG. 2 shows a plan view of the various elements constituting the garment, as they would appear before assembly on the animal; and FIG. 2a illustrates the neck piece as it would appear if laid flat.

The basic garment consists of four elements: two of which (10 and 30) are necessary regardless of the dog's size; one of which (40) is preferred for more complete coverage; and one of which (20) depends upon the dog's size. These components which are each (except as mentioned hereinafter) made of an insulating material such as wool or down quilt, will be separately considered in the order mentioned, with reference jointly made to FIGURES 1 and 2.

Basic coverage for the dog is afforded by the back piece 10 which comprises a rectangular portion 11 for embracing the sides and back of the dog and a pair of co-extending tabs 12 and 14 which joint the girth piece 31, as will be described, in front of the dog's forelegs.

The T-shaped chest and girth strap 30 functions in conjunction with the back piece 10 to maintain the garment in position. The chest portion 31 of this component is affixed in overlying fashion to both of the tabs 12 and 14 in the manner shown, by virtue of the buttons 15' and the parallel array of holes 15. The appropriate hole location is chosen to adjust to the dog's size. While the depicted arrangement shows both tabs adjustable, it is also possible to permanently affix one tab to the chest portion 31 and allow the other to serve the adjustability function.

Having secured the back piece 10 to the chest portion 31 of the T-shaped element 30, the remainder of the latter is now led under the dog toward the rear and the girth strap 32 fastened around the dog at the girth—the point where the chest diameter has begun to decrease. This in conjunction with the tab attachment in front of the forelegs, and without more, prevents forward or backward movement of the garment relative the dog. The girth strap is adjustable to provide a snug fit by virtue of the plurality of button holes 34. Further, it may be noted that while the chest portion 31 must be of sufficient length to reach the girth of the animal, the girth strap 32 may be rolled back upon the chest portion 31 for additional adjustment. If desired, means may be added for attaching the girth strap ends to the back piece. However, such a measure was not found necessary.

The neck piece 40 is angularly disposed with respect to the back piece 10 and is preferably permanently secured. Strings 41 and 42, added to ensure a snug fit of this piece as the animal raises and lowers its head, are tied under the dog's neck (not shown). The desired angular relationship between the neck and back piece may be easily achieved by cutting the interior tab edges so that in conjunction with one another they form a semicircle of radius R, and cutting the neck piece where it joins the tabs in an arc of a greater diameter circle R' (including a straight line) of the same length (see FIG. 2a). It should also be mentioned that neither the strings 41 and 42 nor the girth strap 32 need be made of an insulating material as this property is not necessary to their function.

The rear piece 20 is adapted by the button hole array 21 to be adjustably affixed to the rear of the back piece 10 to accommodate a bigger dog or the same dog as it approaches maturity. The back of the rear piece is shaped to permit movement of the rear legs without abrasion.

From the foregoing, it may be seen that the garment according to the invention is flexible with respect to the animal's size without the disadvantages inherent in a stretchable garment, and that it is maintained in place without restriction upon natural body functions.

While I have described above the principles of my invention in connection with specific apparatus, it is to be clearly understood that this description is made only by way of example and not as a limitation to the scope of my invention as set forth in the objects thereof and in the accompanying claims. For example, while buttons and variously disposed holes therefor are shown and described to fulfill the adjustability function of the invention, many of the numerous arrangements conventionally available would perform suitably. Examples are hooks and eyes, snaps, microscopic loop and hair mating materials, etc.

I claim:
1. A garment for domestic four legged animals such as dogs comprising:
   a substantially rectangular back piece having a pair of tabs coextending from opposing sides at one end thereof;

a T-shaped chest-girth strap, the girth strap constituting the cross-bar of the T and being of sufficient length to surround the animal's girth and the perpendicular chest portion being of sufficient length to extend beyond the major chest diameter of the animal;

adjustable means for securing one end of the girth strap relative the other over the back piece; and means disposed on said tabs and the end of said chest portion for adjustably affixing the former to the latter.

2. The garment claimed in claim 1 in which the last mentioned means includes mating means that are disposed on both tabs and both sides of the end of said chest portion for adjustably securing the chest portion respectively with the tabs.

3. The garment claimed in claim 1 further comprising a neck piece disposed between said tabs and angularly affixed thereto.

4. The garment claimed in claim 3 in which the interior tab edges meet each other at said one end of said back piece in a semicircle and in which the joining edge of said neck piece is an arcuate segment of a circle of greater radius than that forming the said semicircle.

5. The garment claimed in claim 3 further comprising a rear piece and mating means disposed respectively on said rear piece and the rear of said back piece for adjustably joining the former to the latter, said rear and back piece being of substantially the same width during the range of adjustment.

6. The garment claimed in claim 5 in which the rear edge of said rear piece is arcuate.

References Cited by the Examiner

UNITED STATES PATENTS

| | | | |
|---|---|---|---|
| 585,306 | 6/1897 | Dailey | 54—79 |
| 896,446 | 8/1908 | Gordon | 54—79 |
| 1,437,255 | 2/1922 | Mallinson | 54—79 |

SAMUEL KOREN, *Primary Examiner.*

HUGH R. CHAMBLEE, *Assistant Examiner.*